United States Patent
Wang et al.

(10) Patent No.: US 10,149,250 B2
(45) Date of Patent: Dec. 4, 2018

(54) METHOD AND NETWORK NODE FOR MANAGING A TRANSMISSION POWER PARAMETER FOR A D2D LINK

(71) Applicant: Telefonaktiebolaget LM Ericsson (publ), Stockholm (SE)

(72) Inventors: Min Wang, Luleå (SE); Martin Winbjörk, Stockholm (SE)

(73) Assignee: TELEFONATKIEBOLAGET LM ERICSSON (PUBL), Stockholm (SE)

( * ) Notice: Subject to any disclaimer, the term of this patent is extended or adjusted under 35 U.S.C. 154(b) by 152 days.

(21) Appl. No.: 14/889,464

(22) PCT Filed: Oct. 15, 2015

(86) PCT No.: PCT/EP2015/073852
§ 371 (c)(1),
(2) Date: Nov. 6, 2015

(87) PCT Pub. No.: WO2017/063698
PCT Pub. Date: Apr. 20, 2017

(65) Prior Publication Data
US 2017/0188312 A1 Jun. 29, 2017

(51) Int. Cl.
*H04B 7/00* (2006.01)
*H04W 52/18* (2009.01)
(Continued)

(52) U.S. Cl.
CPC ........... *H04W 52/18* (2013.01); *H04W 8/005* (2013.01); *H04W 52/343* (2013.01);
(Continued)

(58) Field of Classification Search
CPC .... H04L 5/0007; H04L 1/0025; H04W 72/04; H04W 72/042; H04W 72/082;
(Continued)

(56) References Cited

U.S. PATENT DOCUMENTS 5,905,720 A 5/1999 Lin
7,647,040 B2 1/2010 Kim
(Continued)

FOREIGN PATENT DOCUMENTS

WO 2010049801 A1 5/2010
WO 2014185836 A1 11/2014

OTHER PUBLICATIONS

Fujitsu, "Resource Allocation for Type 1 D2D Discovery", 3GPP TSG-RAN1 #76bis, Shenzhen, China, Mar. 31, 2014, pp. 1-3, R1-141510, 3GPP.
(Continued)

*Primary Examiner* — Shaima Q Aminzay
(74) *Attorney, Agent, or Firm* — Coats & Bennett, PLLC

(57) ABSTRACT

A network node, a first device and methods therein for managing a transmission power parameter indicating power of transmission to be sent on at least one Device-To-Device "D2D" link between the first device and a second device are disclosed. The method comprises determining a load relating to D2D communication between at least the first and second devices. Moreover, the method comprises determining the transmission power parameter based on the load. Corresponding computer programs and carriers therefor are also disclosed.

13 Claims, 4 Drawing Sheets

(51) Int. Cl.
- *H04W 52/34* (2009.01)
- *H04W 52/38* (2009.01)
- *H04W 8/00* (2009.01)
- *H04W 52/36* (2009.01)
- *H04W 72/04* (2009.01)

(52) U.S. Cl.
CPC ....... *H04W 52/367* (2013.01); *H04W 52/383* (2013.01); *H04W 72/0473* (2013.01)

(58) Field of Classification Search
CPC ... H04W 8/005; H04W 48/08; H04W 72/005; H04W 72/0486; H04W 74/006; H04W 52/246
USPC .......... 455/518, 3.05, 90.2, 425, 452.1, 511; 370/260, 277, 252, 296, 328, 329, 338, 370/395.42
See application file for complete search history.

(56) References Cited

U.S. PATENT DOCUMENTS

| | | | |
|---|---|---|---|
| 7,697,469 B2 | 4/2010 | Wu et al. | |
| 8,181,080 B2 | 5/2012 | Jugl et al. | |
| 8,284,754 B2 | 10/2012 | Chang et al. | |
| 8,761,099 B2 | 6/2014 | Charbit et al. | |
| 8,902,918 B2 | 12/2014 | Huang et al. | |
| 9,515,800 B2 | 12/2016 | Lim et al. | |
| 2011/0004797 A1 | 1/2011 | Gerstenberger et al. | |
| 2011/0243010 A1* | 10/2011 | Geirhofer | H04W 52/08 370/252 |
| 2012/0093098 A1* | 4/2012 | Charbit | H04W 72/04 370/329 |
| 2013/0157676 A1* | 6/2013 | Baek | H04W 72/0486 455/452.1 |

OTHER PUBLICATIONS

Nec, "On resource selection for Type 1 discovery message transmission", 3GPP TSG RAN WG1 Meeting #77, Seoul, Korea, May 19, 2014, pp. 1-4, R1-142172, 3GPP.

Intel, "WF on Repeated Transmissions of Discovery Message within a Discovery Period", 3GPP TSG RAN WG1 #78bis, Ljubljana, Slovenia, Oct. 6, 2014, pp. 1-6, R1-144401, 3GPP.

Ericsson, "Remaining details of Discovery Resource Allocation", 3GPP TSG-RAN WG1 Meeting #79, San Francisco, USA, Nov. 17, 2014, pp. 1-2, R1-145150, 3GPP.

* cited by examiner

METHOD AND NETWORK NODE FOR MANAGING A TRANSMISSION POWER PARAMETER FOR A D2D LINK

TECHNICAL FIELD

Embodiments herein relate to wireless communication systems, such as mixed cellular and Device-To-Device (D2D) systems. In particular, a method and a network node for managing a transmission power parameter indicating power of transmission to be sent on at least one D2D link between a first device and a second device are disclosed. Corresponding computer programs and carriers therefor are also disclosed.

BACKGROUND

A mixed cellular and D2D system allows devices to directly exchange information with each other, i.e. without passing through a base station and a core network as is common with conventional cellular communication systems. An exemplifying mixed cellular and D2D system, e.g. featuring D2D Proximity Services (D2D ProSe), was introduced with Release-12 (Rel-12) of Long Term Evolution (LTE) of the Third Generation Partnership Project (3GPP). With D2D ProSe, two main services for D2D communication are provided; a direct communication service and a direct discovery service.

With the direct communication service, the devices establish a direct user plane connection. The direct communication service primarily includes voice, such as Voice over Internet Protocol (VoIP), and file transfer, such as file transfer over File Transfer Protocol (FTP). With the direct discovery service, the devices transmit and monitor signals that enable them to be aware of proximity to another device or other devices.

Use cases for D2D ProSe include both Public Safety (PS) and commercial use.

In the PS applications, the direct communication service provides basic VoIP connectivity to other devices, independently of cellular coverage, such as LTE coverage, for the devices. Moreover, the direct discovery service may provide functions for detection of presence of peer devices, e.g. based on their professions or the like. Typically, in an emergency situation, it would be beneficial to easily find out if there is any doctor and/or nurse nearby.

In the commercial applications, the direct communication service provides simple push-to-talk functions, where communication typically is be one-to-many. Furthermore, the direct discovery service can broadcast advertisements, such as "pizza for 5$", etc.

In a known mixed cellular and D2D system according to 3GPP Rel-12, a user transmission is sent from a sender device to a receiver device at a specific transmission power for D2D transmissions, i.e. D2D transmissions on so called D2D links between e.g. the sender device and the receiver device.

For cellular transmissions in an LTE system, it is known to set the transmission power according to the following formula:

$$P_{tx} = \min\{P_{max}, P_0 + 10 \cdot \log(M) + \alpha \cdot PL + \delta_{mcs} + f(\Delta_i)\} \quad (1)$$

where:

$P_{max}$: Maximum power allowed by the transmission in for uplink. It depends on the UE category, M: The number of allocated Physical Resource Blocks (PRBs) per user, $P_0$: The power to be contained in one PRB. It is cell specific parameter and measured in dBm/PRB, $\alpha$: Path loss compensation factor. It is a cell specific parameter in the range [0 1], PL: Estimated uplink path loss at the UE, $\delta_{mcs}$: MCS dependent offset. It is UE specific, and $f(\Delta_i)$: closed loop correction function.

However, this formula does not efficiently set the transmission power for D2D transmissions. Typically, the transmission power for D2D transmissions are set to a constant value below an upper power limit, which depends on pathloss. Hence, a disadvantage is that it may be difficult to set the transmission power for D2D links such that improved D2D communication may be achieved.

SUMMARY

An object may be to improve performance of the above mentioned mixed cellular and D2D system.

According to an aspect, the object is achieved by a method for managing a transmission power parameter indicating power of transmission to be sent on at least one D2D link between a first device and a second device. The method comprises determining a load relating to D2D communication between at least the first and second devices. Moreover, the method comprises determining the transmission power parameter based on the load.

According to another aspect, the object is achieved by a network node configured for managing a transmission power parameter indicating power of transmission to be sent on at least one D2D link between a first device and a second device. The network node is configured for determining a load relating to D2D communication between at least the first and second devices. The network node is configured for determining the transmission power parameter based on the load. Furthermore, the network node is configured for sending, to at least the first device, the transmission power parameter.

According to a further aspect, the object is achieved by a first device configured for managing a transmission power parameter indicating power of transmission to be sent on at least one D2D link between the first device and a second device. The first device is configured for determining a load relating to D2D communication between at least the first and second devices. Moreover, the first device is configured for determining the transmission power parameter based on the load.

According to further aspects, the object is achieved by a computer program and a carrier therefor corresponding to the aspects above.

Thanks to that the network node, or the second device, determines the transmission power parameter based on the load relating to D2D communication, the network node may set the transmission power parameter differently depending on the load. For example, the network node may increase the transmission power parameter, i.e. allow a high transmission power, when the load is low, in order to improve transmission efficiency. However, as another example, the network node may decrease the transmission power parameter, when the load is high, in order to improve transmission efficiency. High and low may be determined in relation to a high threshold value and a low threshold value, respectively. In the latter example, the transmission efficiency is improved due to that transmission power of in-band emission is reduced. As a result, less interference towards neighboring devices is generated.

Moreover, an advantage is that power consumption of the first device may be reduced, when the transmission power parameter is decreased. Hence, a so called battery-life of a battery of the first device may be extended.

Furthermore, an advantage is that dropping of services, such as calls, may be reduced, when the transmission power parameter is increased.

Moreover, it shall be noted that the setting of the transmission power has effect on a transmission power level for upcoming transmissions, i.e. the transmission power parameter more or less immediately affects the transmission power of in-band emission.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
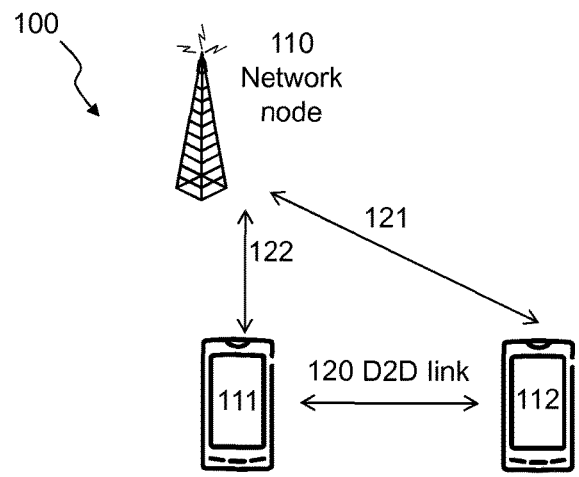
FIG. 1 is a schematic overview of an exemplifying system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying mixed cellular and D2D system 100 in which embodiments herein may be implemented. In this example, the system 100 is a LTE system, e.g. Rel-12 or higher. In this context, a higher release is subsequent in time to Rel-12.

In other examples, the mixed cellular and D2D system 100 may be any cellular or wireless communication system, such as a Universal Mobile Telecommunication System (UMTS), Global System for Mobile communication (GSM) and Worldwide Interoperability for Microwave Access (WiMAX) allowing a layer of D2D communications or the like.

The mixed cellular and D2D system 100 comprises a network node 110, such as a radio network node, an evolved-Node B (eNB), a base station, a relay, a repeater, a radio remote unit a Base Station System (BSS), a Radio Network Controller (RNC), a Radio Base Station (RBS), a control node controlling one or more Remote Radio Units (RRUs), an access point and the like.

FIG. 1 further illustrates a first device 111 and a second device 112. In some examples, the first and second devices 111, 112 are within coverages of the network node 110. This means that the first and second devices 111 are present in the mixed cellular D2D system 100. In other examples, the first and/or second devices 111, 112 are Out-Of-Coverage (OOC) with respect to the network node 110.

The first and second devices 111, 112 may communicate 120 with each other. This communication, sometimes referred to as Sidelink, may include user transmissions and/or control transmissions. The user transmissions may include user data, payload data, content data etc. The control transmissions may include control information relating to e.g. scheduling, authentication, mobility, transmission parameters, transmission power parameter etc. In a typical scenario, the first device 111 sends user transmission to the second device 112. The second device 112 may then send control transmission to the first device 111.

As used herein, the term "device" may refer to a wireless communication device, a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

The network node 110 may communicate 121, 122 with the first and second devices 111, 112. This communication may include user transmissions and/or control transmissions. The user transmissions may include user data, payload data, content data etc. The control transmissions may include control information relating to e.g. scheduling, authentication, mobility etc. The user transmissions are only relevant in case the first device is in a cellular mode. The communication may include uplink transmission and/or downlink transmission. A transmission may be referred to as a data block.

In order to better appreciate the benefits and advantages of the embodiments herein, the following observations are made.

Figure 2:
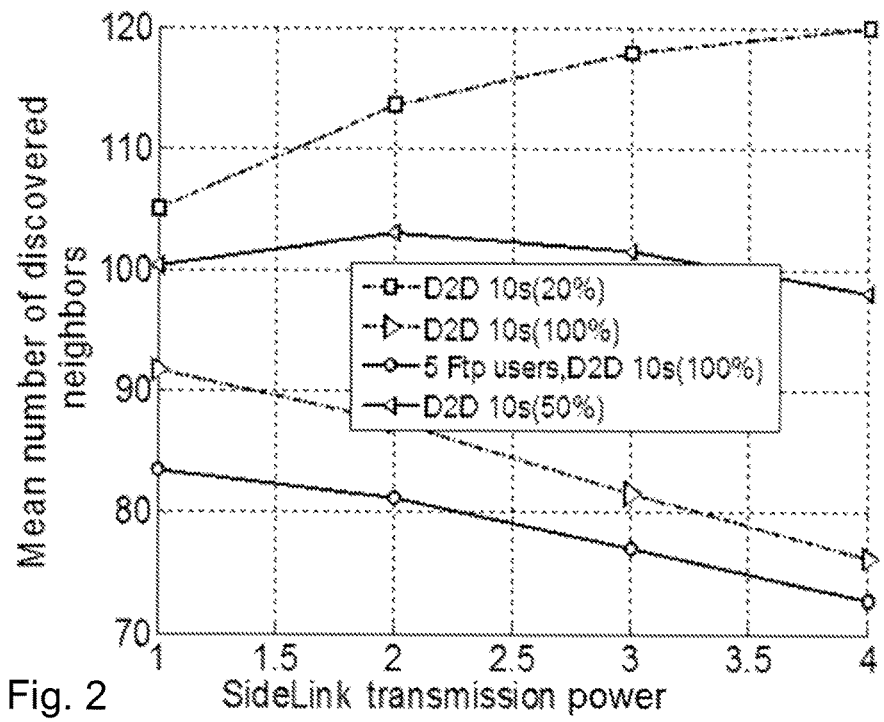
FIG. 2 is a diagram illustrating discovered neighbors as a function of transmission power.
Figure 3:
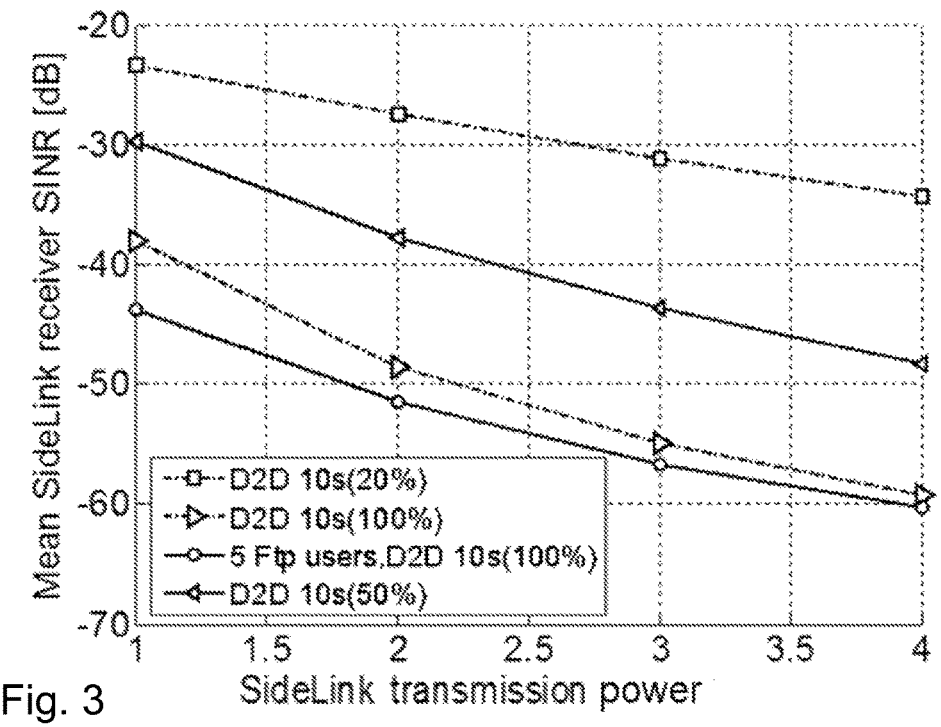
FIG. 3 is a diagram illustrating Signal-To-Interference-and-Noise Ratio (SINR) as a function of transmission power.
Figure 4:
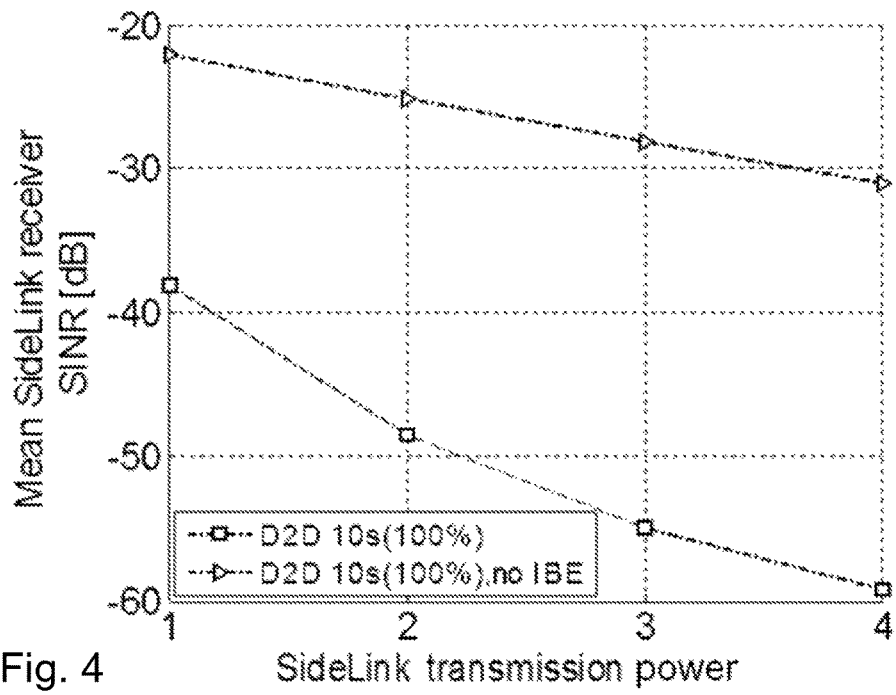
FIG. 4 is another diagram illustrating SINR as a function of transmission power.

FIG. 2 illustrates principal graphs as conclusion when targeting to analyze D2D performance with respect to transmission power for D2D transmissions. In FIGS. 2, 3 and 4, simulations with 75 D2D capable UEs per cell and 5 FTP UEs having uploading and downloading traffic per cell are illustrated. Notable, values of D2D transmission power are purely schematic. For example, along the x-axis in FIGS. 2-4, values 1-4 may correspond to a power of 'a' watts (W) to '4*a' W, where 'a' may be equal to 125 mW (21 dBm), 200 mW (23 dBm), 500 mW (27 dBm) or the like.

In FIG. 2, mean number of discovered neighbors is plotted as a function of D2D transmission power for four different scenarios.

In a first scenario "D2D, 10 s (20%)", only 20% of the 75 D2D capable UEs are involved in D2D communication with some other of the 75 D2D capable UEs. In this scenario, D2D load may be said to be low.

In a second scenario "D2D, 10 s (50%)", 50% of the 75 D2D capable UEs are involved in D2D communication. In this scenario, D2D load may be said to be medium. In a third scenario "D2D, 10 s (100%)", 100% of the 75 D2D capable UEs are involved in D2D communication. In this scenario, D2D load may be said to be high.

In a fourth scenario "5 FTP users, D2D, 10 s (100%)", 100% of the 75 D2D capable UEs are involved in D2D communication and 5 UEs are involved in cellular communication due to FTP uploading and downloading. In this scenario, D2D load may of course be said to be high as well.

From FIG. 2, it can be seen that in the first scenario, with low D2D load, better D2D discovery performance is observed as compared to the other scenarios. Here better D2D discovery performance means that a greater mean number of discovered neighbors are observed, i.e. more neighbors can successfully receive the discovery message. As the D2D transmission power increases, the mean number of discovered neighbors increases. In contrast thereto, as an extreme among these scenarios, it can been seen that, for the fourth scenario with high D2D load, worse D2D discovery performance is observed as compared to the other scenarios. Moreover, as the D2D transmission power increases, the mean number of discovered neighbors decreases. In the fourth scenario, higher D2D transmission power cannot improve the performance due to higher interference. The interference is mainly caused by the power in-band emission from neighboring devices.

FIG. 3 illustrates Signal-To-Interference-and-Noise Ratio (SINR) as a function of D2D transmission power for the four scenarios described above in connection with FIG. 2. From FIG. 3, it can be seen that decrease in SINR is mainly dependent on D2D load, i.e. portion of D2D devices that are involved in D2D communication. A reason to this is that a first difference in SINR for the third and fourth scenarios is much less than a second difference in SINR for the second and third scenarios, or a third difference in SINR for the first and second scenarios.

Moreover, now turning to FIG. 4, SINR as a function of number of D2D transmission power is illustrated. In this Figure, two scenarios with and without consideration of power In-Band Emission (IBE) are illustrated. In this context, power IBE refers to transmission power within time/frequency resource assigned to D2D communication. From the Figure, it is observed that power in-band emission from neighboring devices results in a high drop of the SINR.

Figure 5:
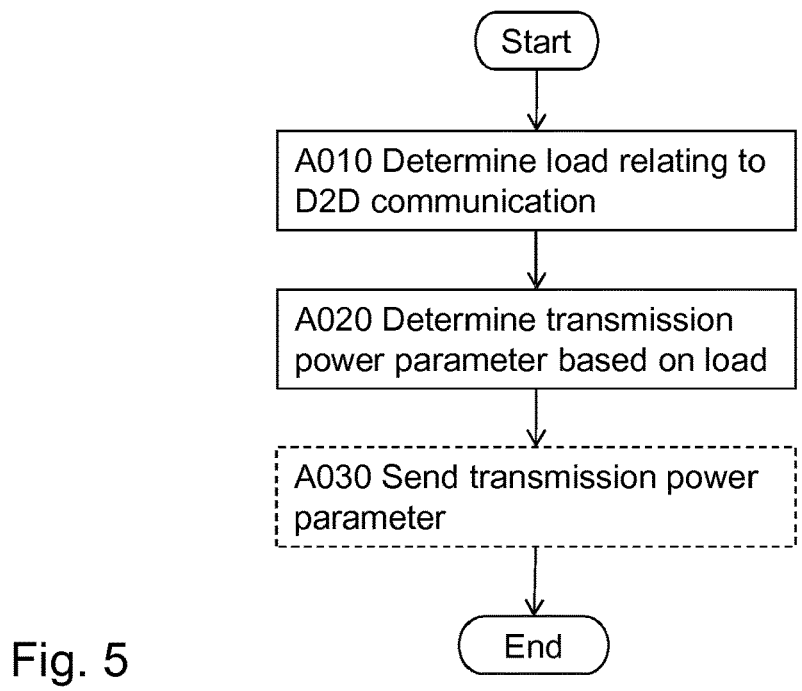
FIG. 5 is a flowchart illustrating embodiments of the method.

FIG. 5 illustrates an exemplifying method according to embodiments herein when implemented in the system 100 of FIG. 1. As an example, the network node 110 performs a method for managing a transmission power parameter indicating power of transmission to be sent on at least one D2D link 120 between the first device 111 and the second device 112. Said at least one D2D link may typically carry user transmissions from the first device 111 to the second device 112.

In other examples the method may be performed by the second device 112. In these examples, said at least one D2D link may additionally carry control transmissions from the second device 112 to the first device 111. In yet further examples, the method may be performed by the first device 111. In these examples, the first device 111 autonomously determines the transmission power parameter to be applied for the transmissions to the second device 112.

For simplicity, the method is described in the following with reference to when the network node 110 performs the method.

One or more of the following actions may be performed in any suitable order.

Action A010

The network node 110 determines a load relating to D2D communication between at least the first and second devices 111, 112. In this manner, the network node 110 obtains the load to be used in action A020 below.

In case of an OOC scenario, it may be that the at least one D2D link is only a particular D2D link between the first and second devices 111, 112. This means that the second device 112 may determine the load based on only the particular D2D link.

However, when the network node 110 performs action A010, the at least one D2D link may be a plurality of D2D links, or even all D2D links managed by the network node 110. This means that the network node 110 may determine the load while taking a plurality D2D links into account.

The load may be determined as exemplified in section "Determining load".

Action A020

Subsequently to action A010, the network node 110 determines the transmission power parameter based on the load.

As an example, the network node 110 determines the transmission power parameter based on the load in an at least partly inverse manner while not exceeding a maximum transmit power of the first device 111. In more detail, transmission power parameter may be determined by a function that is, in some range, inversely proportional to the load. Expressed somewhat differently, the determining A020 of the transmission power parameter comprises determining the transmission power parameter based on the load in an at least partly inverse manner, such as an at least partly proportionally inverse manner.

Since open loop power control for compensating the uplink cellular path loss has been defined in 3GPP Rel-12 for D2D transmission, the formula mentioned in the background section may be updated as (while keeping the notation of the formula from the background section):

$$P_{tx} = \min\{P_{max}, P_0 + 10 \cdot \log(M) + \alpha \cdot PL$$

According to embodiments herein, the load relating to D2D communication is considered when determining the transmission power parameter for D2D transmissions. A higher portion of the maximum transmission power can be used for D2D transmission. While a lower portion of maximum transmission power shall be applied. Accordingly, the formula (2) can be further updated as $$P_{tx} = \min\{P_{max}, P_0 + 10 \cdot \log(M) + \alpha \cdot PL + \beta(k - \text{Load}_{D2D}^2)$$

where

β: D2D load compensation factor. It is a cell specific parameter in the range [0 1], $\text{Load}_{D2D}$: Estimated D2D load, it is a cell specific measurement, and k: is a constant.

Figure 6:
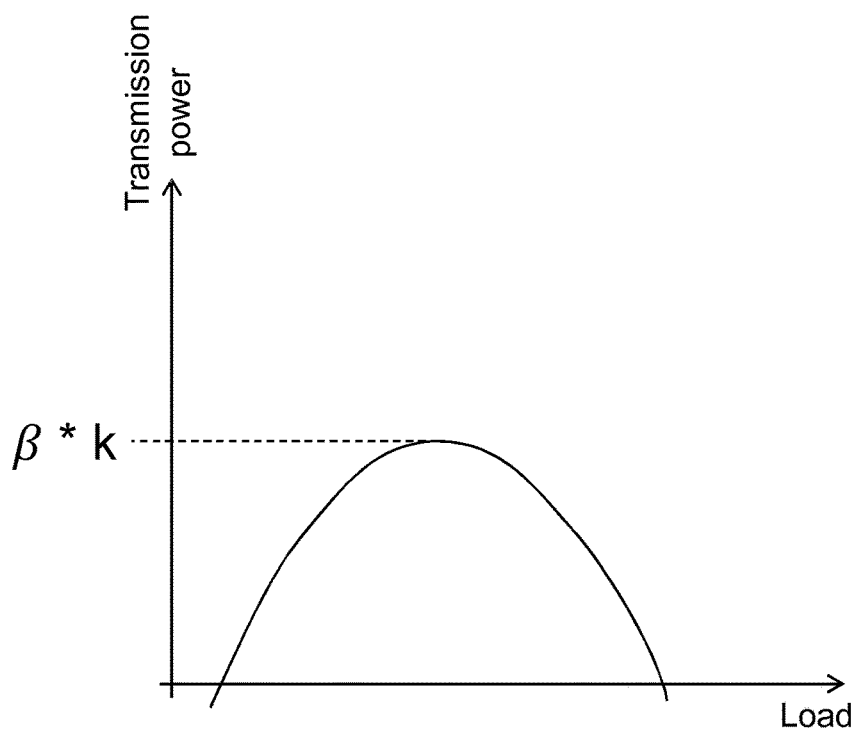
FIG. 6 is a diagram illustrating an exemplifying function of transmission power versus load.

The value range of $P_{tx}$ may be pre-defined according to the transmission power range. As an example, β multiplied by k equals an upper limit for a part contributing to D2D transmission, i.e. $\beta(k-\text{Load}_{D2D}^2)$, as a protection for cellular transmissions against interference from the D2D transmission. FIG. 6 illustrates the part compensating for D2D transmission.

As an example, the transmission power parameter may have three pre-set levels, such as a first, a second and a third transmission power parameter value. Exemplifying values of the first, second and third transmission power parameter may be 125 mW (milliWatts) (21 dBm), 200 mW (23 dBm), and 500 mW (27 dBm). Additionally, there may be two threshold values, such as a high threshold and a low threshold for the load relating to the D2D communication. The network node 110 may then set the transmission power parameter to the first transmission power parameter value when the load is greater than the high threshold. Should the load be less than the low threshold, the network node 110 may set the transmission power parameter to the third transmission power parameter value. In other cases, when the load is between the low and high threshold, the network node 110 may set the transmission power parameter to the second transmission power parameter value.

Other exemplifying formulas may be found, while still applying a principle of reducing the transmission power parameter, in at least one range, when the load is high, where high may be seen relative to a high threshold value.

Action A030

The network node 110 may send, to at least the first device 111, the transmission power parameter.

In Action A030, the network node 110 may signal to at least one of the first and second devices 111, 112 the determined transmission power parameter. There are two ways to send the transmission power parameter to the first and second devices 111, 112: either by System Information Block (SIB) signalling or by dedicated signalling.

The SIB signalling, on the one hand, is suitable if the transmission power parameter is applicable to all devices, such as the first and second devices 111, 112, served by the same cell, e.g. the network node 110.

The dedicated signalling, on the other hand, may provide additional flexibility if the determined transmission power parameter is applicable only to specific devices, such as the first or second device 111, 112.

Both SIB signalling and dedicated signalling may be applied in combination in some examples.

When the second device 112 is out-of-coverage, the transmission power parameter may be received on the Physical Sidelink Broadcast Channel (PSBCH), which is broadcasted by the first device 111 still within coverage.

As an exemplifying further signalling alternative, the network node 110 may pre-configure multiple configurations, i.e. pre-configured transmission power parameters, which are applicable to different load scenarios. The different load scenarios may be identified by the low and/or high thresholds described above. The first and second devices 111, 112 may then obtain the pre-configured transmission power parameters at an occasion, such as during initial attach to the system 100, or at some other time. In this example, the network node 110 does not need to send the transmission power parameter when the load varies. Instead, it will be up to the device, e.g. the first device 110, to choose an appropriate transmission power parameter among the pre-configured transmission power parameters by itself.

The devices, neighbouring to the first device 111, may become aware of the transmission power parameter currently applied in various manners.

The first device 111 may send the transmission power parameter configuration to the neighbouring devices via a D2D control channel, such as Physical Sidelink Control Channel (PSCCH). Alternatively, or even additionally, the first device 111 may include the transmission power parameter in a Medium Access Control (MAC) element of a MAC Packet Data Unit (PDU).

The MAC element may be configured as shown below:

| Group Index | LCG ID | Configuration ID |
| --- | --- | --- |

Group index: The group index field identifies the ProSe (Proximity based Services) Destination. The group is typically composed of devices, such as the first and second device 111, 112, in the vicinity of each other, with the support of the Prose functionality.

LCG ID: The Logical Channel Group (LCG) ID field identifies the group of logical channel(s) which buffer status is being reported.

Configuration ID identifies which configuration to apply according to the signalling The second device 112 may be informed about the transmission power parameter in advance of the transmission thanks to that the first device 111 may perform the following actions:

1. The first device 111 may transmit, to the second device 112, the transmission power parameter to be used in subsequent transmissions. The transmission power parameter may then be included in the MAC element in a separate MAC PDU packet.
2. Next, the first device 111 may transmit data packets while applying the received, from the network node 110 as in action A030, transmission power parameter.

Step 1 may preferably only be executed once during a given period since the transmission power parameter should be static for during the given period. Step 2 is executed in a sub-frame that is different from the sub-frame in which step 1 is executed. Hence, the second device 112 may receive the transmission power parameter and a user data transmission in sequential sub-frames.

Determining Load

Now elaborating on how the load may be determined. The network node 110, or the second device 112, may determine the load based on at least one of:

a number of physical resource blocks used for the D2D communication, a number of sub-frames occupied by the D2D communication, a number of devices involved in the D2D communication, statistics concerning decoding of D2D physical channels of the D2D communication, received power per packet of the D2D communication, a delay of D2D discovery, a delay of D2D transmissions in the D2D communication, a percentage of neighboring devices, being neighbors to at least one of the first device 111 and the second device 112, which neighboring devices are capable of successfully receiving one D2D packet within one transmission period, and the like.

The number of physical resources blocks may indicate the load, since when a great number of physical resource blocks are used for D2D communication a lot of information may be transferred over the D2D link.

The number of sub-frames occupied by the D2D communication may indicate the load, since when a great number of sub-frames are used for D2D communication a lot of information may be transferred over the D2D link.

The number of devices involved in the D2D communication may indicate the load, since for an average transmission activity among the number of devices, the load will increase for an increased number of devices involved in the D2D communication.

The statistics concerning decoding of D2D physical channels of the D2D communication may indicate the load, since when decoding is not successful, it may be a sign of that interference towards said at least one D2D link is too high. As described above in relation to FIG. 3 and/or FIG. 4, such unsuccessful decoding will primarily be dependent on amount of D2D device involved in the D2D communication. Hence, when the load is high, the decoding statistics will indicate many unsuccessful decodings.

The delay of D2D discovery may indicate the load, since if the delay is high, the load is expected to be high due to that many retransmission attempts of the discovery signaling is required. Many retransmission attempts do, in turn, cause a high delay.

The received power per packet of the D2D communication may indicate the load according to similar reasoning as above.

The delay of D2D transmissions in the D2D communication may indicate the load according to similar reasoning as above.

The percentage of devices, being neighbors to the first device 111, which devices are capable of successfully receiving one D2D packet within one transmission period may indicate the load according to similar reasoning as above.

The metrics above indicate how good the D2D performance is. So, the better performance might indicate that the system load is low, while worse performance might indicate that the system load is higher. The above metrics may be combined to provide a better evaluation of the system load. A single metric might not provide as accurate results.

In a further example, an amount of resources used for D2D communication is adjusted based on the load relating to D2D transmission. Hence, when the load is high a greater number of resources is assigned, or reserved, for D2D transmission as compared to when the load is low. Again, "high" and/or "low" may be related to the respective one of the high and low threshold value mentioned above. The resources may refer to number of subframes, physical resource blocks, channels, D2D transmission periodicity or the like, which may be reserved for D2D communication. The D2D transmission periodicity may indicate a so called discovery period.

In a particular embodiment, the method above is performed by the first device 111. In this embodiment, action A030 is not performed. Instead, the first device 111 applies the transmission power parameter in subsequent subframes. This means that the first device 111 will begin to send transmissions according to the determined transmission power parameter.

Figure 7:
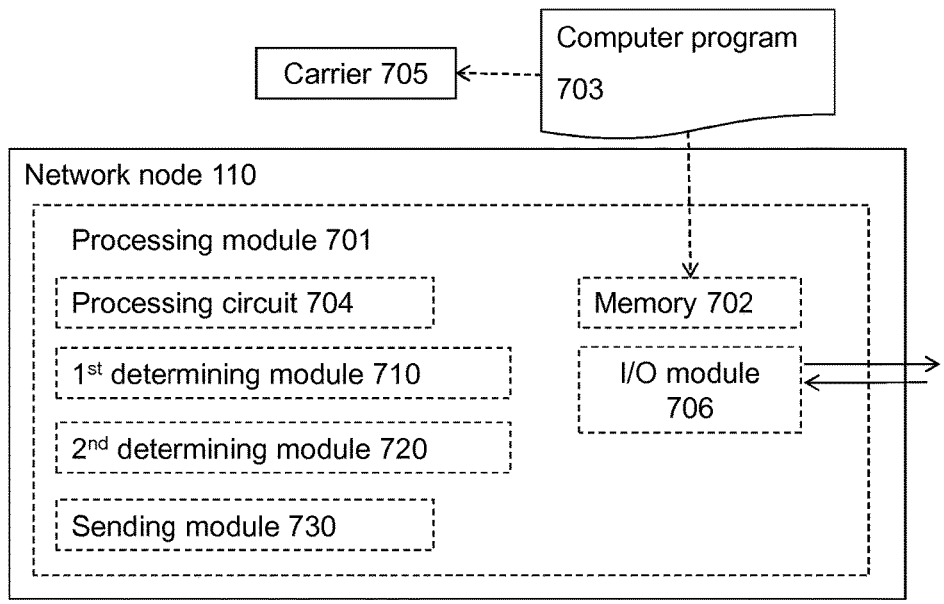
FIG. 7 is a block diagram illustrating embodiments of the network node.

With reference to FIG. 7, a schematic block diagram of embodiments of the network node 110 of FIG. 1 is shown.

The network node 110 may comprise a processing module 701, such as a means, one or more hardware modules and/or one or more software modules for performing the methods described herein.

The network node 110 may further comprise a memory 702. The memory may comprise, such as contain or store, a computer program 703.

According to some embodiments herein, the processing module 701 comprises, e.g. 'is embodied in the form of' or 'realized by', a processing circuit 704 as an exemplifying hardware module. In these embodiments, the memory 702 may comprise the computer program 703, comprising computer readable code units executable by the processing circuit 704, whereby the network node 110 is operative to perform the methods of FIG. 5.

In some other embodiments, the computer readable code units may cause the network node 110 to perform the method according to FIG. 5 when the computer readable code units are executed by the network node 110.

FIG. 7 further illustrates a carrier 705, or program carrier, which comprises the computer program 703 as described directly above.

In some embodiments, the processing module 701 comprises an Input/Output module 706, which may be exemplified by a receiving module and/or a sending module as described below when applicable.

In further embodiments, the processing module 701 may comprise one or more of a first determining module 710, a second determining module 720, and a sending module 730 as exemplifying hardware modules. In other examples, one or more of the aforementioned exemplifying hardware modules may be implemented as one or more software modules.

Accordingly, the network node 110 is configured for managing a transmission power parameter indicating power of transmission to be sent on at least one D2D link 120 between the first device 111 and the second device 112. The network node 110 may be the second device 112.

Therefore, according to the various embodiments described above, the network node 110 and/or the processing module 701 and/or the first determining module 710 is configured for determining a load relating to D2D communication between at least the first and second devices 111, 112.

The network node 110 and/or the processing module 701 and/or the second determining module 720 is/are configured for determining the transmission power parameter based on the load.

Moreover, the network node 110 and/or the processing module 701 and/or the sending module 730 is/are configured for sending, to at least the first device 111, the transmission power parameter.

In some embodiments, the network node 110 and/or the processing module 701 and/or the second determining module 720, or a further determining module (not shown), may be configured for determining the transmission power parameter by determining the transmission power parameter based on the load in an at least partly inverse manner while not exceeding a maximum transmit power of the first device 111.

The network node 110 and/or the processing module 701 and/or the first determining module 710 may be configured for determining the load based on at least one of:
a number of physical resource blocks used for the D2D communication,
a number of sub-frames occupied by the D2D communication,
a number of devices involved in the D2D communication,
statistics concerning decoding of D2D physical channels of the D2D communication,
received power per packet of the D2D communication,
a delay of D2D discovery,
a delay of D2D transmissions in the D2D communication,
a percentage of neighboring devices, being neighbors to at least one of the first device 111 and the second device 112, which neighboring devices are capable of successfully receiving one D2D packet within one transmission period, and the like.

Figure 8:
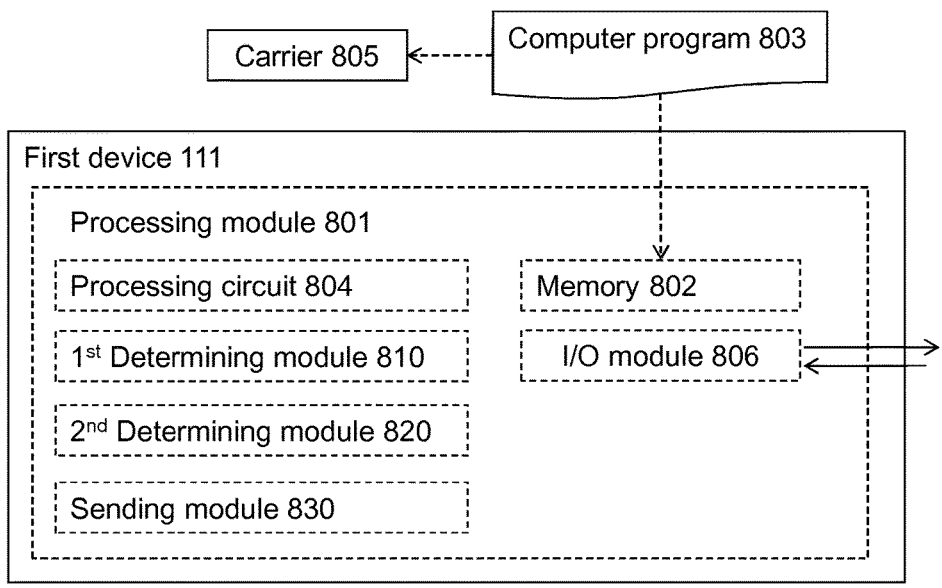
FIG. 8 is a block diagram illustrating embodiments of the first device.

With reference to FIG. 8, a schematic block diagram of embodiments of the first device 111 of FIG. 1 is shown.

The first device 111 may comprise a processing module 801, such as a means, one or more hardware modules and/or one or more software modules for performing the methods described herein.

The first device 111 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the first device 111 is operative to perform the methods of FIG. 5.

In some other embodiments, the computer readable code units may cause the first device 111 to perform the method according to FIG. 5 when the computer readable code units are executed by the first device 111.

FIG. 8 further illustrates a carrier 805, or program carrier, which comprises the computer program 803 as described directly above.

In some embodiments, the processing module 801 comprises an Input/Output module 806, which may be exemplified by a receiving module and/or a sending module as described below when applicable.

In further embodiments, the processing module 801 may comprise one or more of a first determining module 810, a second determining module 820, and a sending module 830 as exemplifying hardware modules. In other examples, one or more of the aforementioned exemplifying hardware modules may be implemented as one or more software modules.

Accordingly, the first device 111 is configured for managing a transmission power parameter indicating power of transmission to be sent on at least one D2D link 120 between the first device 111 and the second device 112. It shall be understood that the first device 111 may send the transmission in some embodiments, but in some other embodiments the first device 111 may receive the transmission.

Therefore, according to the various embodiments described above, the first device 111 and/or the processing module 801 and/or the first determining module 810 is/are configured for determining a load relating to D2D communication between at least the first and second devices 111, 112.

Moreover, the first device 111 and/or the processing module 801 and/or the second determining module 820 is/are configured for determining the transmission power parameter based on the load.

In some embodiments, when the first device 111 receives the transmission on said at least one D2D link, the first device 111 and/or the processing module 801 and/or the sending module 830 is/are configured for sending, to the second device (112), the transmission power parameter.

In some embodiments, the first device 111 and/or the processing module 801 and/or the second determining module 820 is/are configured for determining the transmission power parameter by determining the transmission power parameter based on the load in an at least partly inverse manner while not exceeding a maximum transmit power of the first device 111.

The first device (111) and/or the processing module 801 and/or the first determining module 810 is/are configured to determine the load based on at least one of:
a number of physical resource blocks used for the D2D communication,
a number of sub-frames occupied by the D2D communication,
a number of devices involved in the D2D communication,
statistics concerning decoding of D2D physical channels of the D2D communication,
received power per packet of the D2D communication,
a delay of D2D discovery,
a delay of D2D transmissions in the D2D communication, and
a percentage of neighboring devices, being neighbors to at least one of the first device (111) and the second device (112), which neighboring devices are capable of successfully receiving one D2D packet within one transmission period.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system. In particular, in some examples of the method herein, the network node refers to the first or second device 111, 112.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first device, for managing a transmission power parameter indicating transmission power for a Device-To-Device (D2D) transmission to be sent on at least one D2D link between the first device and a second device, the method comprising: determining a load based on one or more metrics of at least one D2D communication between at least the first and second devices; and determining the transmission power parameter based on the determined load, wherein the determining the transmission power parameter comprises determining the transmission power parameter based on the load in an at least partly inverse manner while not exceeding a maximum transmit power of the first device.

2. The method of claim 1, further comprising sending the transmission power parameter to at least the second device.

3. The method of claim 1, wherein the determining the load is based on at least one of:
   a number of physical resource blocks used for the D2D communication;
   a number of sub-frames occupied by the D2D communication;
   a number of devices involved in the D2D communication;
   statistics concerning decoding of D2D physical channels of the D2D communication;
   a received power per packet of the D2D communication;
   a delay of D2D discovery;
   a delay of D2D transmissions in the D2D communication, and
   a percentage of neighboring devices, being neighbors to at least one of the first device and the second device, which neighboring devices are capable of successfully receiving one D2D packet within one transmission period.

4. A network node configured to manage a transmission power parameter indicating transmission power for a Device-To-Device (D2D) transmission to be sent on at least one D2D link between a first device and a second device, the network node comprising:
   a processing circuit configured to cause the network node to:
       determine a load based on one or more metrics of at least one D2D communication between at least the first and second devices;
       determine the transmission power parameter based on the load, wherein the network node is configured for determining the transmission power parameter by determining the transmission power parameter based on the load in an at least partly inverse manner while not exceeding a maximum transmit power of the first device; and
       sending the determined transmission power parameter to at least the first device.

5. The network node of claim 4, wherein the processing circuit is configured to cause the network node to determine the load based on at least one of:
   a number of physical resource blocks used for the D2D communication;
   a number of sub-frames occupied by the D2D communication;
   a number of devices involved in the D2D communication;
   statistics concerning decoding of D2D physical channels of the D2D communication;
   a received power per packet of the D2D communication;
   a delay of D2D discovery;
   a delay of D2D transmissions in the D2D communication, and
   a percentage of neighboring devices, being neighbors to at least one of the first device and the second device, which neighboring devices are capable of successfully receiving one D2D packet within one transmission period.

6. A first device configured for managing a transmission power parameter indicating transmission power for a Device-To-Device (D2D) transmission to be sent on at least one D2D link between the first device and a second device, the first device comprising: a processing circuit configured to cause the first device to: determine a load based on one or more metrics of at least one D2D communication between at least the first and second devices; and determine the transmission power parameter based on the determined load, wherein the processing circuit is configured to cause the first device to determine the transmission power parameter based on the load in an at least partly inverse manner while not exceeding a maximum transmit power of the first device.

7. The first device of claim 6, wherein the processing circuit is configured to cause the first device to send the transmission power parameter to the second device.

8. The first device of claim 6, wherein the processing circuit is configured to cause the first device to determine the load based on at least one of:
   a number of physical resource blocks used for the D2D communication;
   a number of sub-frames occupied by the D2D communication;
   a number of devices involved in the D2D communication;
   statistics concerning decoding of D2D physical channels of the D2D communication;
   a received power per packet of the D2D communication;
   a delay of D2D discovery;
   a delay of D2D transmissions in the D2D communication, and
   a percentage of neighboring devices, being neighbors to at least one of the first device and the second device, which neighboring devices are capable of successfully receiving one D2D packet within one transmission period.

9. A computer program product stored in a non-transitory computer readable medium for managing a transmission power parameter indicating transmission power for a Device-To-Device (D2D) transmission to be sent on at least one D2D link between a first device and a second device, the computer program product comprising software instructions which, when run on a processing circuit of a network node or the first device or, causes the corresponding network node or first device to: determine a load based on one or more metrics of at least one D2D communication between at least the first and second devices; and determine the transmission power parameter based on the determined load, wherein the determining the transmission power parameter comprises determining the transmission power parameter based on the load in an at least partly inverse manner while not exceeding a maximum transmit power of the first device.

10. The computer program product of claim 9:
   wherein the processing circuit is a portion of the network node; and
   wherein the software instructions, when run on the processing circuit of the network node, cause the network node send the determined transmission power parameter to the first device.

11. The computer program product of claim 9:
   wherein the processing circuit is a portion of the first device; and
   wherein the software instructions, when run on the processing circuit of the first device, cause the first device to send the determined transmission power parameter to the second device.

12. A method, performed by a network node, for managing a transmission power parameter indicating transmission power for a Device-To-Device (D2D) transmission to be sent on at least one D2D link between the first device and a second device, the method comprising:
   determining a load based on one or more metrics of the D2D communication between at least the first and second devices; and
   determining the transmission power parameter based on the determined load, wherein the determining of the transmission power parameter comprises determining the transmission power parameter based on the load in an at least partly inverse manner while not exceeding a maximum transmit power of the first device; and
   sending, to at least one of the first device and the second device, the transmission power parameter.

13. The method of claim 12, wherein the determining of the load is based on at least one of:
   a number of physical resource blocks used for the D2D communication;
   a number of sub-frames occupied by the D2D communication;
   a number of devices involved in the D2D communication;
   statistics concerning decoding of D2D physical channels of the D2D communication;
   a received power per packet of the D2D communication;
   a delay of D2D discovery;
   a delay of D2D transmissions in the D2D communication, and
   a percentage of neighboring devices, being neighbors to at least one of the first device and the second device, which neighboring devices are capable of successfully receiving one D2D packet within one transmission period.

* * * * *